June 4, 1935.  D. P. LAVIETES  2,003,373
TOBACCO PIPE
Filed Jan. 24, 1934
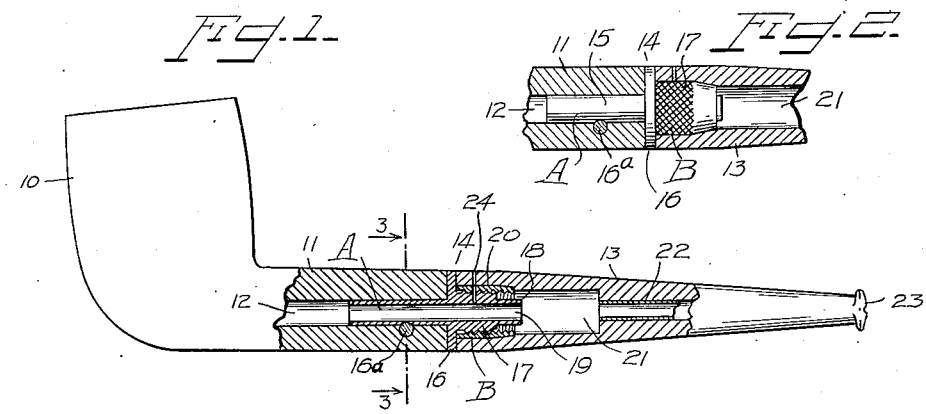
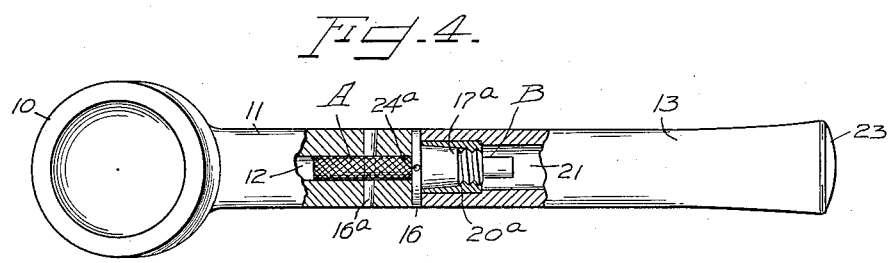
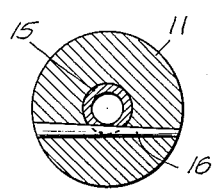 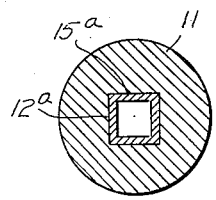 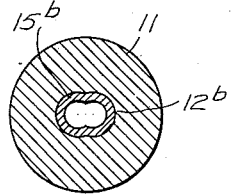
David P. Lavietes
INVENTOR
BY
ATTORNEY Patented June 4, 1935

2,003,373

UNITED STATES PATENT OFFICE 2,003,373

TOBACCO PIPE

David P. Lavietes, Brooklyn, N. Y.

Application January 24, 1934, Serial No. 708,026

4 Claims. (Cl. 131—12)

My invention relates to improvements in tobacco pipes and is particularly directed to what is termed the screw bit type of connection between the bowl stem and the pipe bit.

In practice it has been an extremely difficult thing to do to construct and maintain constant alignment of a screw type connection in pipes of this character, i. e. in the usual construction the bit is provided with a threaded stem which screws into the threaded bore of the bowl stem and when the threaded stem has brought the shoulder at its inner end into contact with the end of the bowl stem, the flattened tip of the bit should be exactly at right angles to the vertical axis of the pipe bowl. If carefully calculated a new pipe will have the bit and bowl in proper relation to each other, but after the pipe has been put in use and the bit removed and replaced several times the contacting surfaces of the bit and stem become worn away with the result that the screw in the stem takes up on worn parts and the bit is turned to a point where it is out of alignment with the bowl. A pipe in this condition is practically worthless and it is due largely to the impracticability of the screw bit type of construction that the separable slide or push fit joint is so widely used in pipes.

With the foregoing in mind, it is the purpose of my invention to provide a unit of such construction that, while the pipe bit and bowl stem may be provided with a screw type union it will not be subjected to any wear or distortion which will prevent constant and proper positioning of the parts to bring the bit in exact alignment with the axis of the bowl. I accomplish this object by providing complemental threaded units preferably both of metal, carried by the bowl stem and bit, respectively, and designed to be permanently fixed in their respective parts and capable of being screwed one over the other only to a point which will bring the bit into exact relation with respect to the axis of the pipe bowl.

A further object of my invention is to provide a screw type union for a pipe in which the threads of the connection are of such a pitch as to require a minimum number of turns of the bit to insure a perfect connection between the bit and stem and I accomplish this object by tapering the male portion of the unit and threading the extreme tip only, while the female portion correspondingly tapered and threaded so as to enable the one portion to be inserted axially of the other portion and then turned on the threads to wedge the portions together.

A still further object of this invention is to provide one of the complementary units of the union with a collar or flange which forms a seat of metal at the free end of the bowl stem and against which the metal lined end of the bit is screwed when the latter is brought into proper position on the stem, whereby the contact of the two metal surfaces prevents turning of the screw too far and the consequent displacement of the two parts of the pipe.

And a still further object of the invention is to prevent turning of the respective complementary units of the union in the bowl stem and bit and I accomplish this object by permanently affixing the shanks of the units in position by a pin driven through the stem or bit and embedding itself in the surface of the shank without interfering with the smoke passage therein, or by making the shank of an irregular transverse section and giving the bore into which it is received a corresponding shape.

And another object of the invention is to introduce an air inlet into the smoke passage of the union, whereby air is drawn into the smoke passing between the stem and bit to produce a cool, dry smoke condition in the pipe.

Other objects and advantages will appear from the following detail description thereof taken in connection with the drawing illustrating several forms my improved pipe may take. In the drawing, Figure 1 is a longitudinal sectional view of a pipe embodying a screw union and means for fixing the parts of the union in their respective members of the stem and bit. Figure 2 is an elevational view of the screw union shown in Figure 1. Figure 3 is a substantially transverse sectional view taken on lines 3—3 of Figure 1. Figure 4 is a substantially longitudinal sectional view of a pipe embodying a construction similar to that shown in Figure 1 except that the union is provided with a combined conical and screw joint. Figure 5 is a transverse sectional view taken in the bowl stem and shank of one member of the union and Figure 6 is a similar view showing a modified form of shank.

Referring to the drawing, 10 denotes the bowl, 11 its stem and 12 a uniform passage or bore to establish communication between the bowl and a bit 13 removably attached to the stem. The stem 11 and bit 13 are detachably connected by means of a screw union 14 which is constructed preferably of metal and which is capable of insuring perfect alignment of the bowl and bit irrespective of any ordinary force used to turn the screw too far.

The union 14 is constructed of two complementary units A and B, one thereof being adapted to fit the bore 12 of the bowl stem and the other being introduced into the inner end of the bit 13. The unit A comprises a tubular shank 15 projecting into the bore 12 and prevented from turning therein by a tapered pin 16ª which is driven through an opening drilled transversely of the stem 11 and tangential with respect to its bore so as to bite into the outer surface or wall of the shank 15 without entering or obstructing the bore thereof. In Figures 5 and 6 the same purpose is accomplished without the pin by making the shank of square tubing 15ª and broaching the bore 12ª or by forming the shank 15ᵇ substantially elliptical in transverse section and providing the stem with intersecting parallel bores 12ᵇ to conform to the shank 15ᵇ. According to Figures 1 to 3, the outer end of the shank 15 terminates in an annular flange 16, which seats against the free end of the stem 11, and which is provided with an externally threaded nipple 17, the pitch of the threads thereof being of an angle to require a minimum number of turns of the unit B to bring it tightly against the flange 16. A relatively short length of tubing 18 projects from the free end of the nipple 17 and a uniform smoke passage or bore 19 is established throughout the unit A.

Referring now to the complementary unit B, illustrated in Figures 1 and 2, the same is permanently fixed in the inner end of the bit 13 and comprises a sleeve 20, exteriorly knurled and tapered at its free end to be driven into the end of an enlarged smoke chamber 21 of the bit, the chamber communicating with a smaller metal lined bore 22 running to the tip 23 of the bit. The tip 23 is preferably of a flattened elliptical transverse section, the major axis thereof being substantially at right angles to the upright axis of the bowl of the pipe when the bit is screwed into the stem and its free inner end abuts the flange 16. The bore of the sleeve 20 is threaded throughout its length to screw over the threads of the nipple 17.

In the modification shown in Figure 4, the nipple 17ª is tapered inwardly from the flange 16 and threaded at its tip only, the pitch of the threads being such as to draw the bit against the flange and into proper position by practically one turn. Accordingly the bore of the sleeve 20ª is tapered inwardly towards its inner end to fit snugly over the taper of the nipple 17ª and is provided with corresponding threads to accommodate the threads at the end of the nipple. This construction facilitates replacing and removing the bit from the stem, because it is simply necessary to insert the nipple axially of the sleeve and give the bit one or two turns to seat it against the flange.

The union according to the present invention is provided with an air opening 24, which is formed by drilling a small passage through the bit proper, metal sleeve 20 and threaded nipple or screw tenon 17 to establish communication with the smoke passage. The opening 24 is drilled after the pipe has been completely assembled so as to insure perfect register of each section of the opening. According to the embodiment of the invention shown in Figure 4 the opening 24ª consists of a single section drilled radially in the flange 16. In each instance air is introduced into the small smoke aperture formed by the union 14 between the bowl and the smoke chamber 21 of the bit.

In practice the sleeve 20 is mounted in the bit 13 and securely affixed therein by the use of cement or any other suitable agent which grips the knurled surface and holds the sleeve against relative movement with respect to the bit. The threaded nipple 17 of the unit A is then screwed into the sleeve 20 to bring its outer end tightly against the flange 16. The bit 13 and union 14 at this point is practically integral. The shank 15 is then inserted into the bore 12 and the bit positioned so as to bring the major axis of its tip 23 at right angles to the upright axis of the bowl 10. The shank 15 is permanently locked in this position in the stem 11 by drilling a tapered opening transversely thereof along a tangent of the bore 12 and by inserting therein the tapered pin 16ª, which is preferably longer than the opening, and which has its projecting smaller end trimmed off flush with the exterior surface of the stem. This arrangement insures perfect alignment of the bit at all times and throughout the life of the pipe, because when the metal end of the sleeve 20 contacts with the surface of the metal flange 16 it can be turned no further along the screw connection and at the point of contact of these two metal parts the tip 23 of the bit is in its correct position relative of the axis of the bowl.

What I claim is:—

1. In a tobacco pipe comprising a bowl member having a stem and a bit member having a well therein, the combination therewith of a screw plug to unite the bowl and stem and the bit, comprising complementary units, one thereof projecting into and being locked in the stem at one end and embracing the end thereof at its midportion and having a threaded projection at the opposite end, the other unit being fixed in the well of the bit and threaded to receive the threaded end of the first unit, said first unit having a preformed groove in the outer wall thereof, and a pin driven transversely through the stem and into substantially tangential engagement with the first unit, whereby when the units are screwed together the end of the second unit and bit abut the portion of the first unit embracing the end of the stem and the bit is prevented from being turned too far on the stem.

2. In a tobacco pipe comprising a bowl member having a stem provided with a bore and a bit having a well therein, the combination therewith of a screw plug to unite the bowl and stem and bit, comprising complemental screw engaging members, one thereof projecting into the bore and having a spacing collar disposed with one face against the end of the stem, the other member comprising a sleeve fixed in the well and adapted to screw over the first member to bring the bit into engagement with the other face of the collar and prevent turning the bit too far with respect to the bowl, said sleeve having a preformed groove in the outer wall thereof, and a pin inserted transversely of the stem and engaged in the sleeve to lock the same against relative movement after the bit and screw plug have been adjusted to proper position with respect to the stem.

3. In a tobacco pipe of the character described, the combination of a bowl member and a bit therefor, a screw plug to unite the bowl and bit, said plug having a preformed groove in the outer wall thereof, and means inserted in the bowl member to bite into the screw plug and prevent relative movement thereof with respect to the bowl member.

4. In a tobacco pipe of the character described, the combination of a bowl having a bored shank and a bit to form a continuation of said shank, a screw plug to unite the shank and bit, comprising complementary units, one thereof being screwed into the other and fixed in the bit and the other having a tubular portion inserted in the bore of the shank and being adjustable to bring the bit and shank into proper position with respect to each other, said tubular portion having a preformed groove in the outer wall thereof, and a pin driven transversely through the shank and into tangential engagement with the tubular portion to prevent movement thereof in the shank.

DAVID P. LAVIETES.